US006628733B1

(12) United States Patent
Tomiyoshi et al.

(10) Patent No.: US 6,628,733 B1
(45) Date of Patent: Sep. 30, 2003

(54) DIVERSITY RECEIVING DEVICE AND METHOD THEREOF

(75) Inventors: Norio Tomiyoshi, Kanagawa (JP);
Takushi Mikami, Kanagawa (JP);
Yoshinobu Haga, Kanagawa (JP);
Osamu Yamano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/438,133

(22) Filed: Nov. 10, 1999

(30) Foreign Application Priority Data

Nov. 10, 1998 (JP) .......................................... 10-318793

(51) Int. Cl.[7] ................................................ H04B 7/10
(52) U.S. Cl. .................. 375/347; 455/277.1; 455/277.2
(58) Field of Search ................................ 375/147, 148, 375/150, 149, 152, 260, 261, 267, 271, 278, 284, 285, 346, 347, 349; 370/314, 320, 321, 332, 333, 334, 335, 342, 441, 350; 455/501, 506, 63, 65, 67.3

(56) References Cited

U.S. PATENT DOCUMENTS

| | | | | |
|---|---|---|---|---|
| 5,239,541 A | * | 8/1993 | Murai .......................... | 370/345 |
| 5,561,673 A | * | 10/1996 | Takai et al. .................. | 714/708 |
| 5,621,770 A | * | 4/1997 | Zastera ........................ | 375/347 |
| 5,781,592 A | * | 7/1998 | Masuda ....................... | 375/347 |
| 5,940,454 A | * | 8/1999 | McNicol et al. ............. | 375/347 |
| 5,960,046 A | * | 9/1999 | Morris et al. ................ | 375/347 |
| 6,047,019 A | * | 4/2000 | Ishii ............................ | 375/148 |
| 6,141,392 A | * | 10/2000 | Hoshikuki et al. .......... | 375/347 |

FOREIGN PATENT DOCUMENTS

| | | |
|---|---|---|
| JP | 57-164628 | 10/1982 |
| JP | 58-15342 | 1/1983 |
| JP | 5-22201 | 1/1993 |
| JP | 8-107380 | 4/1996 |

* cited by examiner

*Primary Examiner*—Chi Pham
*Assistant Examiner*—Khanh Cong Tran
(74) *Attorney, Agent, or Firm*—Katten Muchin Zavis Rosenman

(57) ABSTRACT

Signals from antennas A and B are alternately switched by an antenna switch at a predetermined rate. Then, the signals from the antennas A and B are alternately input to a wireless receiving unit. The wireless receiving unit orthogonal-signal-detects the signals received by the antennas A and B, and inputs the detected signals to a branch selecting unit. The branch selecting unit extracts only the signals from either of the antennas from the signals obtained from the antennas A and B, which are alternately arranged in time series, and transmits the extracted signals to a matched filter. A searcher obtains despreading timings from correlation values, and stores the obtained timings in two memories. The searcher obtains despreading timings with large correlation values, and transmits the timings to a despreading unit to perform RAKE reception.

19 Claims, 8 Drawing Sheets

DIVERSITY RECEIVING DEVICE AND METHOD THEREOF

BACKGROUND OF THE INVENTION

1. Field of the Invention

The present invention relates to a diversity receiving device in spread spectrum communications.

2. Description of the Related Art

For a receiving circuit used in a mobile communications device such as a cellular phone, etc., a diversity receiving device adopting a plurality of antennas is frequently used in order to prevent a reception quality from being degraded due to a changing transmission path. The diversity receiving device is used to lower the probability that the quality of a reception signal is degraded when receiving a faded wave. In spread spectrum communications, antenna diversity for selecting the outputs of a plurality of antennas, and path diversity for distinguishing between reception signals according to a time difference thereof, are implemented. With the antenna diversity, wireless receiving units are respectively arranged for a plurality of antennas, and all of receiving systems are continually operated, so that signals of good reception quality are selected and despread.

For the path diversity, its effects are obtained by separating a reception signal with the use of an arrival time difference between electronic waves, which is caused by different transmission paths, and by despreading and combining the separated signals.

FIG. 1 is a block diagram exemplifying the configuration of a conventional CDMA diversity receiving device.

In FIG. 1, signals received by two antennas A and B are detected by wireless receiving units 83-1 and 83-2. Within the wireless receiving units 83-1 and 83-2, the signals received by the antennas A and B are first amplified by variable amplifiers 82-1 and 82-2 that are controlled by ALC controllers 80-1 and 80-2. Mixers 81-1 and 81-2 convert the RF band signals into baseband signals by multiplying the signals from the variable amplifiers 82-1 and 82-2 by the cyclic waves which correspond to the signal carrier waves and are output from a local oscillator not shown. The baseband signals are detected by orthogonal-signal-detector 84-1 and 84-2. The reason why the wave detectors are represented as the orthogonal-signal-detectors 84-1 and 84-2 is that both of CDMA signals I and Q received by the antennas A and B are assumed to be detected. Their actual operations are similar to those of a normal detector. They are specifically called orthogonal-signal-detectors, since the CDMA signals I and Q are orthogonal each other. However, if a reception signal is not composed of the signals I and Q, the orthogonal-signal-detectors 84-1 and 84-2 shown in this figure can be replaced with normal detectors. The ALC controllers 80-1 and 80-2 perform a control so as to make the outputs from the wireless receiving units 83-1 and 83-2 constant by using the outputs of the orthogonal-signal-detectors 84-1 and 84-2 as inputs, and by providing a driving signal to the variable amplifiers 82-1 an 82-2.

The reason that the ALC controllers 80-1 and 80-2 are arranged as described above is to improve conversion accuracy when an analog signal is converted into a digital signal by an A/D converter which is not shown in this figure and is arranged at the stage succeeding the wireless receiving units 83-1 and 83-2. Namely, the intensities of the signals received by the antennas A and B vary due to an influence of fading, etc. In A/D conversion, the intensity of a signal to be converted is estimated, and the number of bits of a digital signal after being converted is determined. However, if the intensity of a reception signal is much lower than an estimated value, also the intensities of the signals output from the wireless receiving units 83-1 and 83-2 become very much low. As a result, a minimum unit used when the intensity of an analog signal is digitized becomes unsuitable, so that an analog signal with a low intensity cannot be digitized with high accuracy. Namely, when an analog signal with a low intensity slightly changes, it is represented as a digital signal with no change. This is because the minimum unit of digitization of an analog value is larger than the amount of this change, which is relatively large for a signal with a low intensity and includes information. That is, digitization noise becomes relatively large for an analog signal with a low intensity, so that a meaningful change of a signal value is not regenerated as a digital signal.

Accordingly, the wireless receiving units 83-1 and 83-2 detect all of reception signals after amplifying them to signals of a same level under the control of the ALC controller 80-1 and 80-2, and transmits the detected signals to a circuit at a succeeding stage. After the detected signals output from the wireless receiving units 83-1 and 83-2 are converted into digital signals by the A/D converter not shown, they are input to a branch selecting unit 85. The branch selecting unit 85 selects either of the signals from the antennas A and B, and transmits the selected signal to a matched filter 86. The branch selecting unit 85 selects either of branches A and B (the system which receives the signals from the antenna A is referred to as a branch A, while the system which receives the signals from the antenna B is referred to as a branch B) with a branch selection instructing signal input from a searcher 87. The signal output from the branch selecting unit 85 is despread by the matched filter 86 with a despreading code instructed by the searcher 87, and correlation values at respective timings are calculated. The correlation values obtained by the matched filter 86 are transmitted to the searcher 87. The searcher 87 determines whether the currently obtained correlation values are either the values from the branch A or those from the branch B based on the contents of the branch selection instructing signal transmitted to the branch selecting unit 85. If the searcher 87 determines that the currently obtained correlation values are those from the branch A, the correlation values are stored in an antenna A delay profile memory 88-1. If the searcher 87 determines that the correlation values are those from the branch B, the correlation values are stored in an antenna B delay profile memory 88-2.

Then, the searcher 87 respectively reads the correlation values from the antenna A delay profile memory 88-1 and the antenna B delay profile memory 882, and obtains correlation values which are equal to or larger than a predetermined value and their despreading timings. The despreading timings can be easily obtained if the correlation values are stored in time series and the timing of the first correlation value is stored as memory contents. A plurality of the despreading timings thus obtained by the searcher 87 are timing lags delayed by multipath. And, since the matched filter 86 despreads signals with the same despreading code, they are the signals of the same channel. The searcher 87 transmits the despreading code and the despreading timings obtained as described above to a finger allocating unit 90.

The finger allocating unit 90 allocates the despreading code and the despreading timings, which are transmitted from the searcher 87, to a plurality of fingers 91-1 through 91-n, and makes the plurality of fingers 91-1 through 91-n perform a despreading process respectively. Each of the fingers 91-1 through 91-n is composed of a sliding correlator and a synchronous-signal-detector, and is intended to despread the received signal with the despreading code allocated by the finger allocating unit 90 at respectively allocated despreading timings, and to detect a transmitted signal. Namely, in a CDMA communication made by a portable terminal, despreading timings may differ due to multipath fading even if signals are of the same channel. Therefore, the searcher 87 selects a plurality of despreading timing candidates from among the correlation values obtained from the matched filter 86, and makes the fingers 91-1 through 91-n perform a despreading process at respective timings to detect signals. As shown in this figure, the signals despread by the respective fingers 91-1 through 91-n are signals which are directly input from the wireless receiving units 83-1 and 83-2 to the finger allocating unit 90 via the A/D converter not shown. As a result of despreading these signals with the same despreading code, signals of the same channel are regenerated. The despread signals are input to an ALC cancelling unit 94. The ALC cancelling unit 94 obtains the information indicating which branch signal is amplified by what multiple, and cancels an amplification result obtained by the ALC control, for example, by multiplying the signal amplified by a multiple "n" by 1/n. The reason why such cancelling is made is that noise accompanying a signal with a low intensity is amplified more than that accompanying a signal with a high intensity when the signal with the low intensity is amplified by the ALC control to the same level as that of the signal with the high intensity, and despread signals are much influenced by the noise if they are combined unchanged. For this reason, the ALC cancelling unit 94 cancels the signal amplification made by the ALC control, and inputs the signals to a combining unit 92. The combining unit 92 adds the synchronously detected signals from the fingers 91-1 through 91-n, whose amplification operations are cancelled by the ALC cancelling unit 94. Since the respective fingers 91-1 through 91-n perform a despreading process at different timings when the synchronously detected signals are added, the timings at which the synchronously detected signals are output may differ. Accordingly, the combining unit 92 comprises a RAM, etc., in which the synchronously detected signals from the respective fingers 91-1 through 91-n are once stored. All of the signals are output from the RAM in synchronization with one another, and added. With the addition operation, the degradations of the signals transmitted over a plurality of paths can be averaged. The added signals are then decoded by a decoder 93, and the decoded signals are transmitted to a data receiving unit (not shown) at a succeeding stage. The above described method for arranging a plurality of fingers 91-1 through 91-n and for almost simultaneously performing a despreading process and synchronous-signal-detection at different timings is called RAKE reception.

One of vital objectives in the development of a spread spectrum communications portable terminal is to save space and power.

Therefore, the conventional diversity receiving circuit requiring wireless receiving units which are difficult to be put into LSIs, and the number of which is equal to the number of antennas, is a big obstacle to this objective.

SUMMARY OF THE INVENTION

An object of the present invention is to provide a diversity receiving circuit which can save space and power.

A diversity receiving device according to the present invention, which uses a plurality of antennas in spread spectrum communications, comprises: a plurality of antennas; a switching unit for switching between the signals from the plurality of antennas, and outputting the switched signals; a wireless receiving unit for receiving the signal in which the signals from the plurality of antennas are alternately arranged in time series, and for detecting the signal; a separating unit for separating the detected signal including the signals from the plurality of antennas into the respective signals from the plurality of antennas; an extracting unit for extracting despreading timings from the signals output from the separating unit; and a decoding unit for despreading the detected signal including the signals from the plurality of antennas at the despreading timings extracted by the extracting unit, for RAKE-receiving the despread signal, and for decoding the signal.

A diversity receiving method according to the present invention, which uses a plurality of antennas in spread spectrum communications, comprising the steps of: (a) switching between the signals from the plurality of antennas, and outputting the switched signals; (b) receiving the signal obtained in the above described step (a), in which the signals from the plurality of antennas are alternately arranged in time series, and detecting the signal; (c) separating the detected signal, which is obtained in the step (b) and includes the signals from the plurality of channels, into the respective signals from the plurality of antennas; (d) extracting the despreading timings from the signals obtained in the step (c); and (e) despreading the detection signal of the signals from the plurality of antennas at the despreading timings extracted in the step (d), RAKE-receiving the despread signal, and decoding the RAKE-received signal.

According to the present invention, even if a plurality of antennas are arranged for diversity reception, only one configuration for detecting the signals from the plurality of antennas can be arranged and shared for the antennas. Even if the number of antennas increases, the configuration required for making detection remains to be only one. As a result, the hardware configuration can be simplified, which leads to a reduction in device size. Furthermore, since only one configuration for making detection is arranged for a plurality of antennas, thereby consuming less power.

DESCRIPTION OF THE PREFERRED EMBODIMENTS

Figure 2:
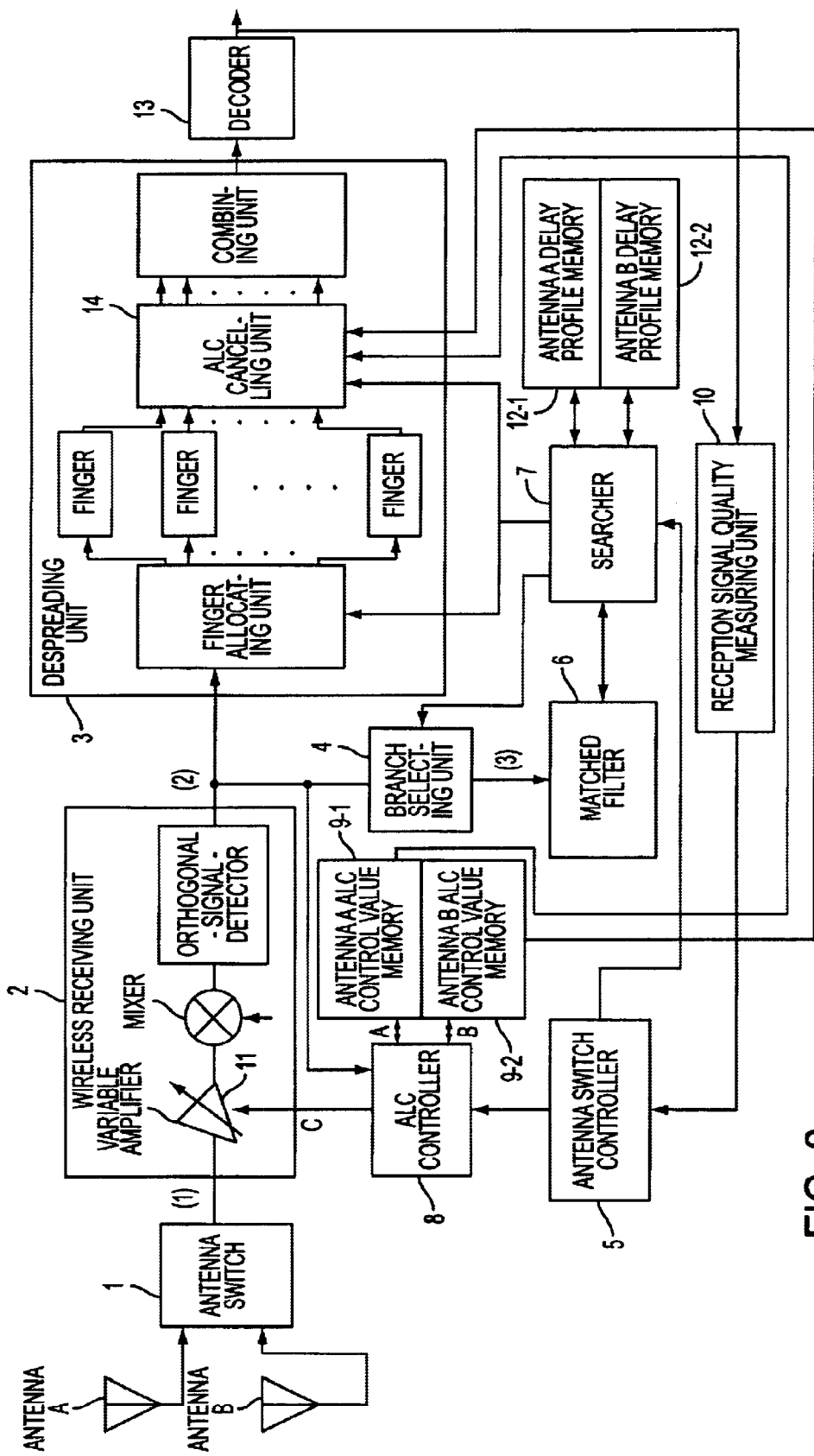
FIG. 2 is a block diagram showing the configuration of a first preferred embodiment according to the present invention.

FIG. 2 is a block diagram showing the configuration of a first preferred embodiment according to the present invention.

In this preferred embodiment, two antennas A and B are arranged in order to make diversity reception. The antennas A and B are connected to an antenna switch 1. The antenna switch 1 switches between the antennas A and B at predetermined time intervals to alternately output the signals from the antennas A and B. The signal output from the antenna switch 1 is converted into a baseband signal in a wireless receiving unit 2, orthogonal-signal-detected, and transmitted to a despreading unit 3. The signal from the wireless receiving unit 2 is also input to a branch selecting unit 4. Since the signal input to the branch selecting unit 4 is either of the signals from the antennas A and B, which are switched by the antenna switch 1, these signals are alternately input in time series. The antenna switch 1 is controlled by an antenna switch controller 5. Also the timing at which an antenna is switched is managed by the antenna switch controller 5. This antenna switch timing signal is input to a searcher 7. The searcher 7 determines whether the signal from the antenna A or that from the antenna B is to be processed. For example, if the signal from the antenna A is selected, the searcher 7 transmits a control signal to the branch selecting unit 4 so that only signals from the antenna A are extracted from a signal sequence in which signals from the antennas A and B are alternately arranged in time series. The branch selecting unit 4 transmits only the signals of the selected branch to a matched filter 6 based on the control signal transmitted from the searcher 7 (or the timing signal for extracting only the signals of the system of the antenna A (branch A) or the signals of the system of the antenna B (branch B)).

Additionally, the signals from the wireless receiving unit 2 are also input to the ALC controller 8 so as to adjust the amplification ratio of a variable amplifier 11. Signals input to the wireless receiving unit 2 are signals which are alternately transmitted from the antennas A and B in time series. However, since the power levels of the signals received by the antennas A and B are normally different, the amplification ratio of the variable amplifier 11 must be rapidly changed at the moment of the switching between the branches A and B, when the ALC controller 8 performs control so as to make the signal outputs from the wireless receiving unit 2 constant. When the amplification ratio is rapidly changed as described above, the ALC control does not properly function and the level of the signal output from the wireless receiving unit 2 suddenly changes at the moment of the switching. Accordingly, for the signal in which the signals from the antennas A and B output from the wireless receiving unit 2 are alternately arranged, the information indicating what level of the control voltage is applied to the variable amplifier 11 to amplify the previous signals transmitted from the antenna A is stored in an antenna A ALC control value memory 9-1, and the information indicating what level of the control voltage is applied to the variable amplifier 11 to amplify the previous signals transmitted from the antenna B is stored in an antenna B ALC control value memory 9-2. By referencing the stored information, the operations of the variable amplifier 9 at the moment of the switching between the signals from the antennas A and B are controlled. The ALC controller 8 determines the amplification ratio of the variable amplifier 11 at the moment of the switching between the branches A and B, according to the set values. Thereafter, the levels of the signals output from the wireless receiving unit 2 are made constant by the ALC control. In this way, a sudden change of the output of the wireless receiving unit 2, which can possibly occur at the moment of the switching between the branches A and B, can be prevented.

The searcher 7 obtains correlation values that are equal to or larger than a predetermined value and their despreading timings from among a plurality of correlation values stored in an antenna A delay profile memory 12-1 or an antenna B delay profile memory 12-2, and provides the obtained values and timings to the despreading unit 3, in a similar manner as in the conventional technique. Because the operations of a finger allocating unit, fingers, and a combining unit within the despreading unit 3 are the same as those explained in the conventional technique, their explanations are omitted here. An ALC cancelling unit 14 obtains from the searcher 7 the information indicating whether the signal cancelling the ALC control is either the signal from the antenna A or that from the antenna B, reads an ALC control voltage from the ALC control value memory 9-1 or 9-2 corresponding to the antenna indicated by the information, evaluates an amplification ratio, and cancels the ALC control with its inverse number. The signal value output from the despreading unit 3 is decoded by a decoder 13, and the decoded signal is transmitted to a data processing circuit not shown.

Here, the output of the decoder 13 is transmitted to a reception signal quality measuring unit 10, which is a circuit for measuring a bit error rate of a reception signal or a circuit for measuring a signal-to-noise ratio.

If a synchronous word inserted in a reception signal is fixed, the reception signal quality measuring unit 10 measures the bit error rate of the synchronous word during a certain time period (several wireless frames). If the bit error rate is lower than a predetermined value, the antenna switching is suspended (antenna fixing). If the bit error rate is higher than the predetermined value, the antenna switching is resumed. Or, the signal-to-noise ratio of the signal after being decoded is measured. If the ratio is lower than a predetermined value, the antenna switching is suspended (antenna fixing). If the ratio is higher than the predetermined value, the antenna switching is resumed.

Namely, if a good reception quality of the signal after being decoded is determined to be obtained so that an influence by fading can be determined to be small, the reception signal quality measuring unit 10 transmits a switching suspension signal to the antenna switch 1. The antenna switch 1 which has received the switching suspension signal suspends the switching between the antennas A and B, so that only the signals from either of the antennas are received. It does not matter from which antenna signals are received. That is, a good reception quality is a quality which has a predetermined level or higher, and is considered to have a small influence by fading and to gain a small advantage of the antenna diversity. The reception signal quality measuring unit 10 determines whether or not the transmission quality equal to or higher than a predetermined level is obtained. If the transmission quality equal to or higher than the predetermined level is obtained, a signal of good quality can be obtained from whichever of the antennas A and B. Accordingly, it does not matter to the antenna switch 1 which antenna to select. The antenna switch therefore selects either of the antennas.

Figure 3:
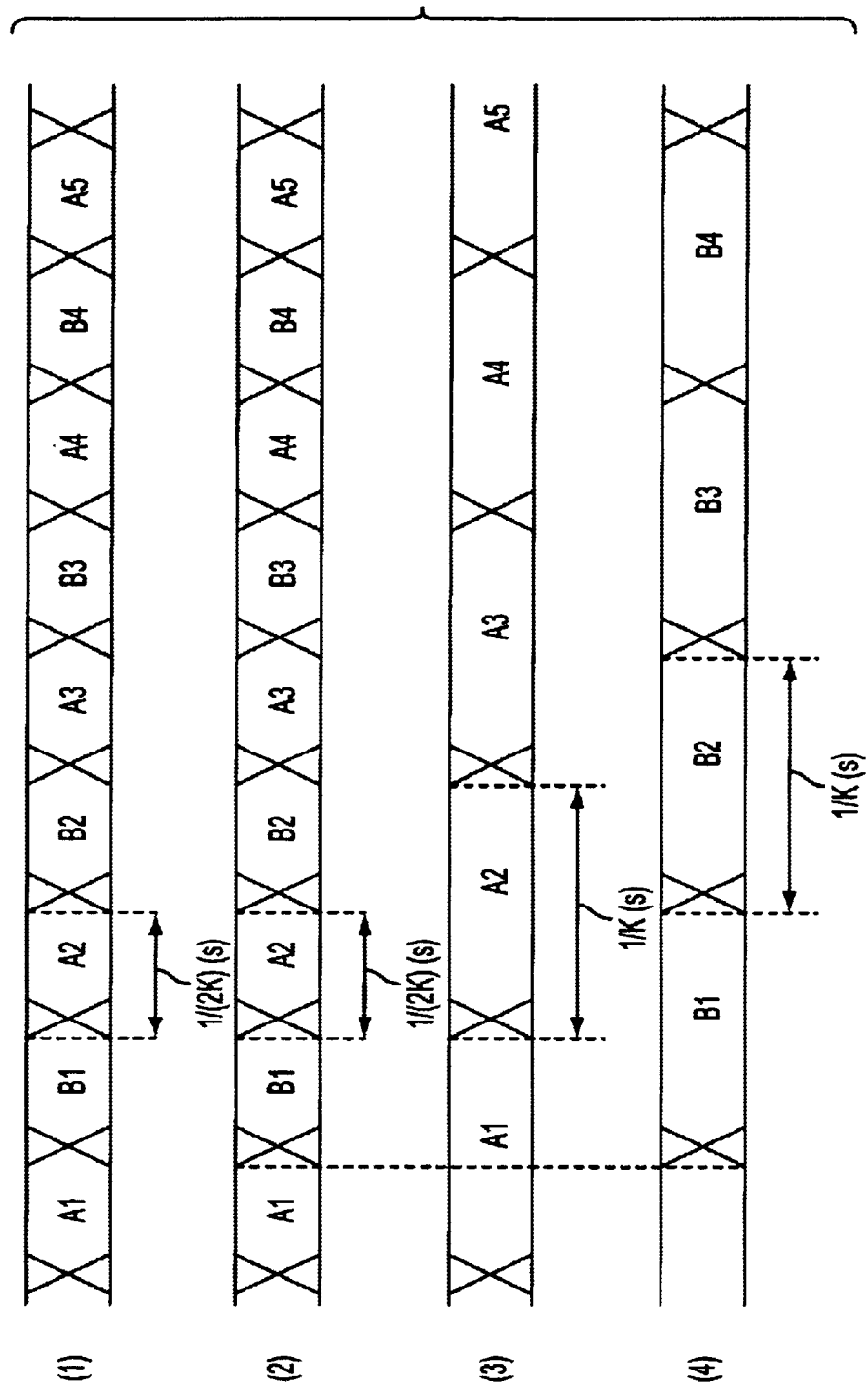
FIG. 3 is a timing chart showing the timing relationships between signal lines (1), (2), and (3) shown in FIG. 2.

FIG. 3 is a timing chart showing the timing relationships between signal lines (1), (2), and (3), which are shown in FIG. 2.

Here, assume that a reception chip rate is "k" chips per second, A1, A2, A3, . . . indicate the signals received from the antenna A, and B1, B2, B3, . . . indicate the signals received from the antenna B. The signals indicated as "(3) branch A" are signals when the branch A is selected by the branch selecting unit 4 shown in FIG. 2, while the signals indicated as "(4) branch B" are signals when the branch B is selected.

As shown in (1) of FIG. 3, the antenna switch 1 switches between the antennas A and B at a rate (an interval) of 2k times/second. Namely, the duration of the signal output from the antenna switch 1 from when the switching is made to one antenna till when the switching is made to the other is 1/(2k) seconds. Accordingly, by switching between the antennas A and B at the rate of 2k times/second, signals with the duration of 1/(2k) seconds such as A1, B1, A2, B2, A3, B3, . . . are output from the antenna switch 1. These signals are amplified, converted into baseband signals, and orthogonal-signal-detected by the wireless receiving unit 2, and the orthogonal-signal-detected signals are output to the signal line (2) shown in FIG. 2. When reaching the signal line (2), the analog signals have already been converted into digital signals by an A/D converter not shown. In the states of the signals on the signal line (2), the signals A1, A2, A3, . . . from the antenna A and the signals B1, B2, B3, . . . from the antenna B, which have the duration of 1/(2k) seconds, are alternately arranged in time series as shown in (2) of FIG. 3. The signals on the signal line (2) are input to the branch selecting unit 4 unchanged. The branch selecting unit 4 selects and outputs either of the signals from the branches A and B.

For example, if the signals of the branch A are selected, only the signals A1, A2, A3, . . . from the antenna A are output like the signals indicated as "(3) branch A" of FIG. 3. Because the branch selecting unit 4 extracts only the signals of the branch A from the signal in which the signals from the antennas A and B are alternately arranged in time series and outputs the extracted signals, the signal from the antenna A, which is input immediately preceding the signal from the antenna B, continues to be output while the signal from the antenna B is input. Namely, as is known from the schematic showing the signals indicated as "(3) branch A" in FIG. 3, the duration of each of the signals A1, A2, A3, . . . from the antenna A is 1/k seconds, which is double the above described duration. One example of a method for implementing such operations of the branch selecting unit 4 is a method for arranging respective memories which temporarily store the signals from the antennas A and B, for continuing to output the contents of the memory storing the signals from the antenna A (such as A1) at the timing when a signal from the antenna B is input, and for storing a new signal (such as A2) in an antenna A memory, and outputting the new signal (A2 in this case) instead of the preceding signal (A1 in this case) when the new signal from the antenna A (A2 in this case) is input.

The case where the branch B is selected within the branch selecting unit 4 is similar. Namely, only the signals B1, B2, B3, . . . from the antenna B are selected and output within the branch selecting unit 4. "(3) branch B" of FIG. 3 illustrates this state. Likewise the branch A explained earlier, the durations of the signals B1, B2, B3, . . from the antenna B are 1/k seconds, and an immediately preceding signal from the antenna B continues to be output while a signal from the antenna A is input from the signal line (2).

The searcher 7 which has received a switch control signal from the antenna switch controller 5 transmits to the branch selecting unit 4 the signal for selecting either of the branches A and B. The signal from the searcher 7 is a signal with which each signal is read in the above described memory of the branch selecting unit 4 at the beginnings of the signals A1, A2, A3 . . . on the signal line (2) shown in FIG. 3, on the condition that the branch A is selected.

Figure 4:
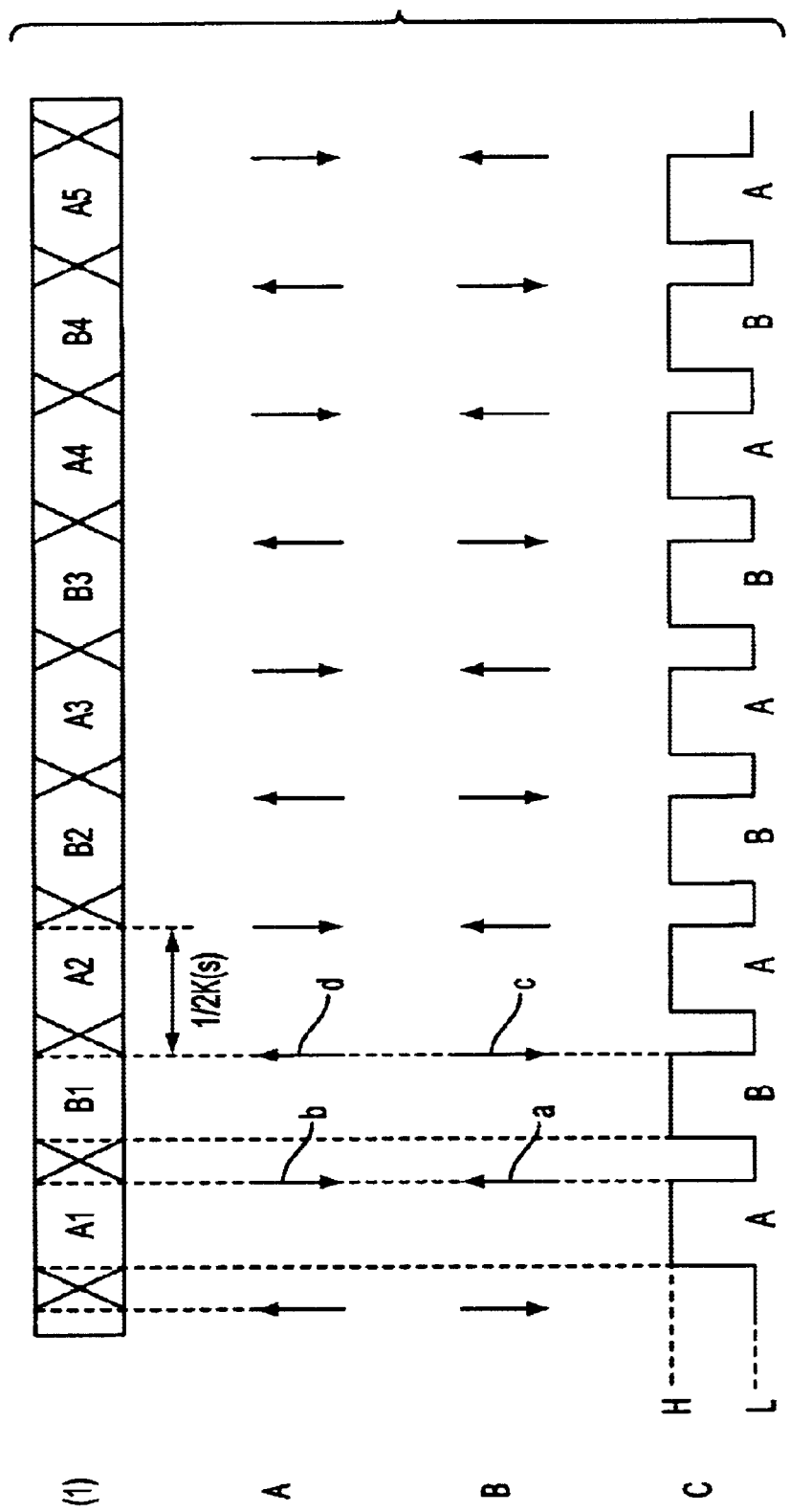
FIG. 4 is a timing chart showing the signal flows and the timings of the signal lines A, B, and C, which are shown in FIG. 2.

FIG. 4 is a timing chart showing the flows and the timings of signals on the signal lines A, B, and C, which are shown in FIG. 2. "A" shown in FIG. 4 represents the timing at which data is loaded from the antenna A ALC control value memory 9-1 (indicated by an upward arrow), and the timing at which data is stored in the antenna A ALC control value memory 9-1 (indicated by a downward arrow). The rising edge of each of the signals (A1, A2, . . . ) of the branch A on the signal line (1) corresponds to a signal for loading data from the antenna A ALC control value memory 9-1, while its falling edge corresponds to a signal for storing data in the antenna A ALC control value memory 9-1. "B" shown in this figure represents the timing at which data is loaded from the antenna B ALC control value memory 9-2 (indicated by an upward arrow), and the timing at which data is stored in the antenna B ALC control value memory 9-2 (indicated by a downward arrow). The rising edge of each of the signals (B1, B2, . . . ) of the branch B on the signal line (1) corresponds to a signal for loading data from the antenna B ALC control value memory 9-2, while its falling edge corresponds to a signal for storing data in the antenna B ALC control value memory 9-2.

An H level of "C" shown in this figure represents ON of the ALC control, while its L state indicates OFF of the ALC control. Additionally, "A" and "B" respectively represent the case where the signal of the branch A is amplified, and the case where the signal of the branch B is amplified.

Immediately after the antenna switch 1 switches from the antenna A to the antenna B, the ALC controller 8 reads the control voltage value to be used from the antenna B ALC control value memory 9-2 (the operation indicated by an arrow "a"), and outputs the read value to the variable amplifier 11. The voltage of the variable amplifier 11 is controlled by making a comparison between the signal power after being orthogonal-signal-detected and a predetermined reference power value, and the ALC control is performed so as to equalize the signal power after being orthogonal-signal-detected and the reference power. Immediately after the antenna switch 1 switches from the antenna A to the antenna B, the immediately preceding control voltage value for the variable amplifier 11 within the wireless receiving unit 2 is stored in the antenna A ALC control value memory 9-2 (indicated by an arrow "b"). Immediately before the antenna B is switched to the antenna A, the ALC controller 8 writes the control voltage value output at that time point to the antenna B ALC control value memory (indicated by an arrow "c").

Figure 5:
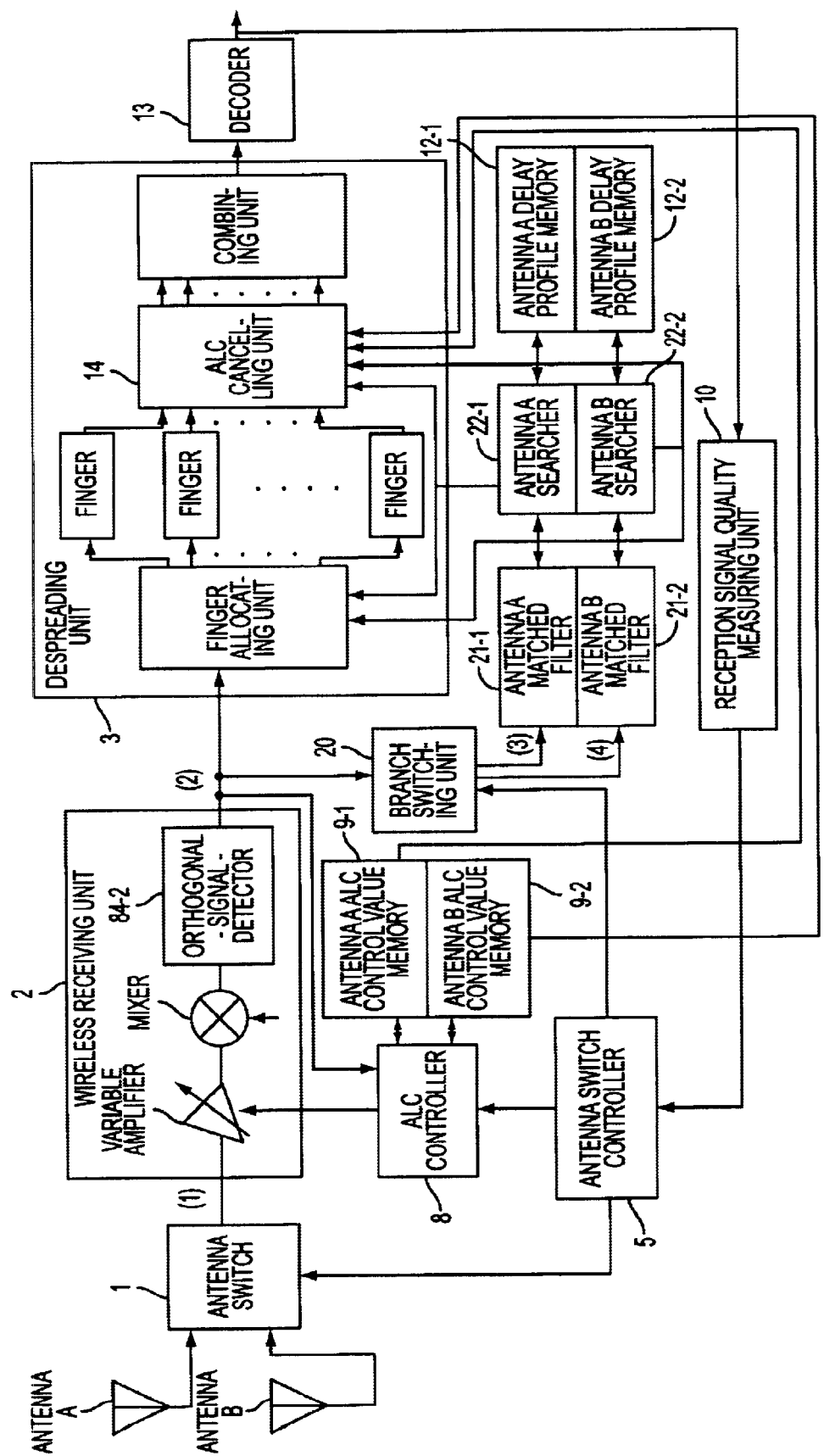
FIG. 5 is a block diagram showing the configuration of a second preferred embodiment according to the present invention.

FIG. 5 is a block diagram showing the configuration of a second preferred embodiment according to the present invention.

Figure 1:
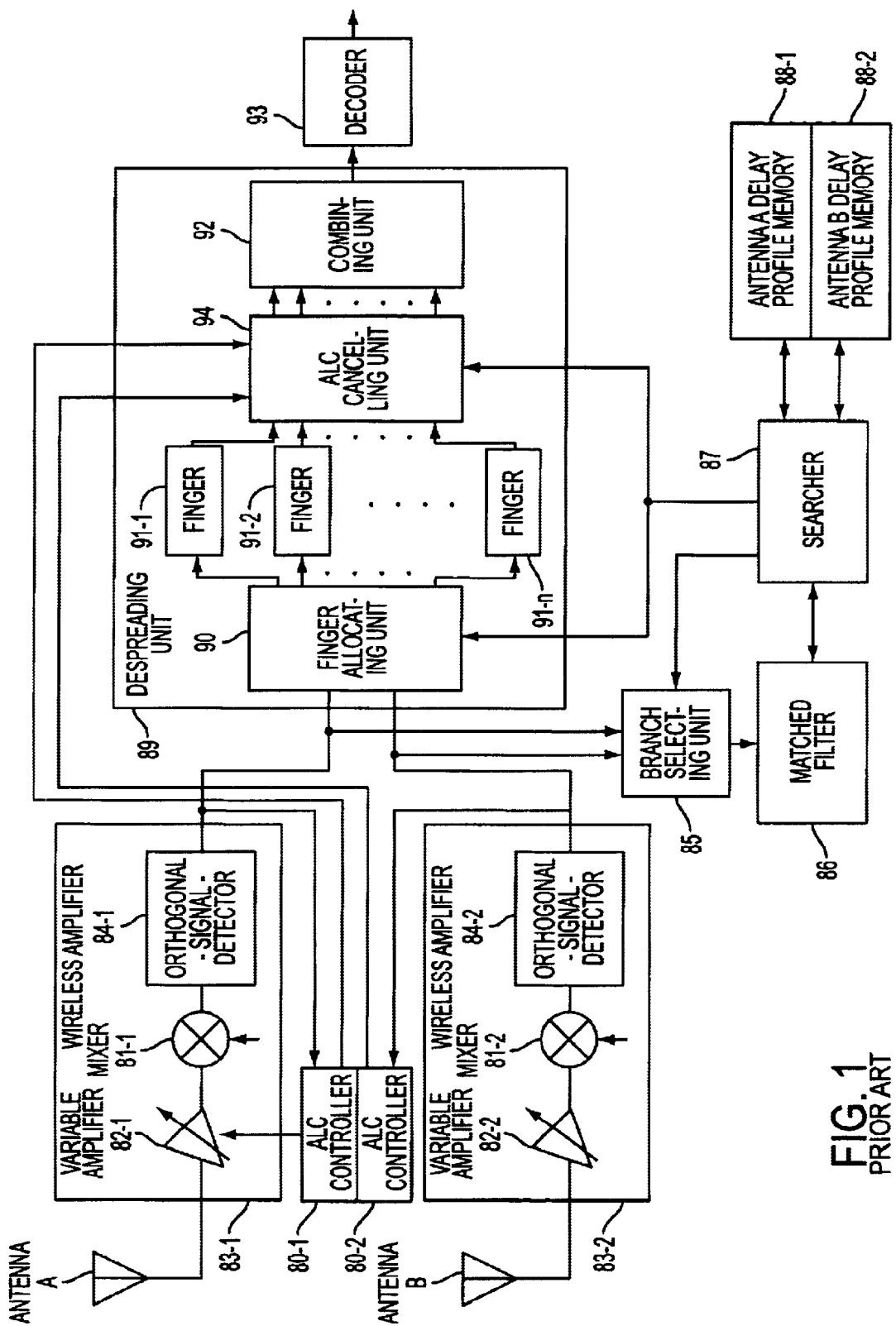
FIG. 1 is a block diagram exemplifying the configuration of a conventional CDMA diversity receiving device.

In this figure, the same constituent elements as those shown in FIG. 1 are denoted with the same reference numerals.

In the first preferred embodiment, only one searcher and matched filter are arranged for both of the antennas A and B. In the second preferred embodiment, however, a searcher and a matched filter are respectively arranged for the antennas A and B.

The signals from either of the antennas A and B are selected with a branch selection operation and the selected signals are delay-profile-measured in the first preferred embodiment, whereas the signals received from both of the antennas A and B can be simultaneously delay-profile-measured in the second preferred embodiment. Assuming that the reception chip rate is "k" chips/second, the antenna switching rate is 2k times/second also in the second preferred embodiment.

That is, the signals from the antennas A and B, which are alternately switched by the antenna switch 1, are input to the wireless receiving unit 2 in the form where the signals from the antennas A and B are alternately arranged in time series. The wireless receiving unit 2 performs the ALC control explained in the first preferred embodiment, and the signal after being orthogonal-signal-detected is input to the despreading unit 3. The signal after being orthogonal-signal-detected is also input to a branch switching unit 20. The branch switching unit 20 separates the signal where the signals from the antennas A and B are alternately arranged in time series into the respective signals from the antennas A and B. The branch switching unit 20 inputs only the signals from the antenna A to an antenna A matched filter 21-1, and only the signals from the antenna B to an antenna B matched filter 21-1. The branch switching unit 20 receives the signal which is synchronous with the control signal of the antenna switch 1 and is output from the antenna switch controller 5, and separates the signal into the respective signals from the antennas A and B. Namely, the branch switching unit 20 receives the timing signal which switches between the antennas A and B from the antenna switch controller 5, and identifies the timing at which the signals from the antenna A or B are input according to the timing at which the switching between the antennas A and B is made. For example, the signals from the antenna A are stored in a branch A memory arranged within the branch switching unit 20, while the signals from the antenna B are stored in a branch B memory arranged within the branch switching unit 20. As will be described later, the signals which are switched at the rate of 2k times/second ("k" is a signal chip rate, and its unit is times/second) are put into signals with a duration of 1/k seconds, and these signals are input to the antenna A matched filter 21-1 and the antenna B matched filter 21-2.

The correlation values which are respectively output from the antenna A matched filter 21-1 and the antenna B matched filter 21-2 are input to an antenna A searcher 22-1 and an antenna B searcher 22-2. The antenna A searcher 22-1 and the antenna B searcher 22-2 obtain the despreading timings from the correlation values acquired from the antenna A matched filter 21-1 and the antenna B matched filter 21-2, and output despreading codes to be used for a despreading process to the antenna A matched filter 21-1 and the antenna B matched filter 21-2. The despreading codes, the correlation values, and the information about the despreading timings, which are obtained by the antenna A searcher 22-1 and the antenna B searcher 22-2, are stored in the antenna A delay profile memory 12-1 and the antenna B delay profile memory 12-2. Then, the antenna A searcher 22-1 extracts the correlation values from the antenna A delay profile memory 12-1, determines whether or not the obtained correlation values are equal to or larger than a predetermined value, and obtains the despreading timings having correlation values which are equal to or larger than the predetermined value. Similarly, the antenna B searcher 22-2 extracts the correlation values which are equal to or larger than a predetermined value, and obtains the despreading timings corresponding to the extracted correlation values.

The antenna A searcher 22-1 and the antenna B searcher 22-2 notify the finger allocating unit within the despreading unit 3 of the despreading codes and the despreading timings, and inputs to the ALC cancelling unit 14 the information indicating from which antenna the signals to be input to the ALC cancelling unit 14 are received. The ALC cancelling unit 14 then obtains the information indicating the multiple by which the signals from each of the antennas are amplified from the antenna A ALC control value memory 9-1 and the antenna B control value memory 9-2 based on the above described information, and attenuates the levels of the signals so as to cancel the amplification operation obtained by the ALC control. In this way, an influence of noise can be prevented. The signals output from the ALC cancelling unit 14 are combined by a combining unit, and decoded by a decoder 13.

The quality of the signal after being decoded is examined by the reception signal quality measuring unit 10. When determining that the quality is equal to or higher than a predetermined level, the reception signal quality measuring unit 10 issues to the antenna switch controller 5 an instruction for suspending the antenna switching operation. When determining that the quality of the signal after being decoded is lower than the predetermined level, the reception signal quality measuring unit 10 issues to the antenna switch controller 5 an instruction for resuming the antenna switching operation.

Figure 6:
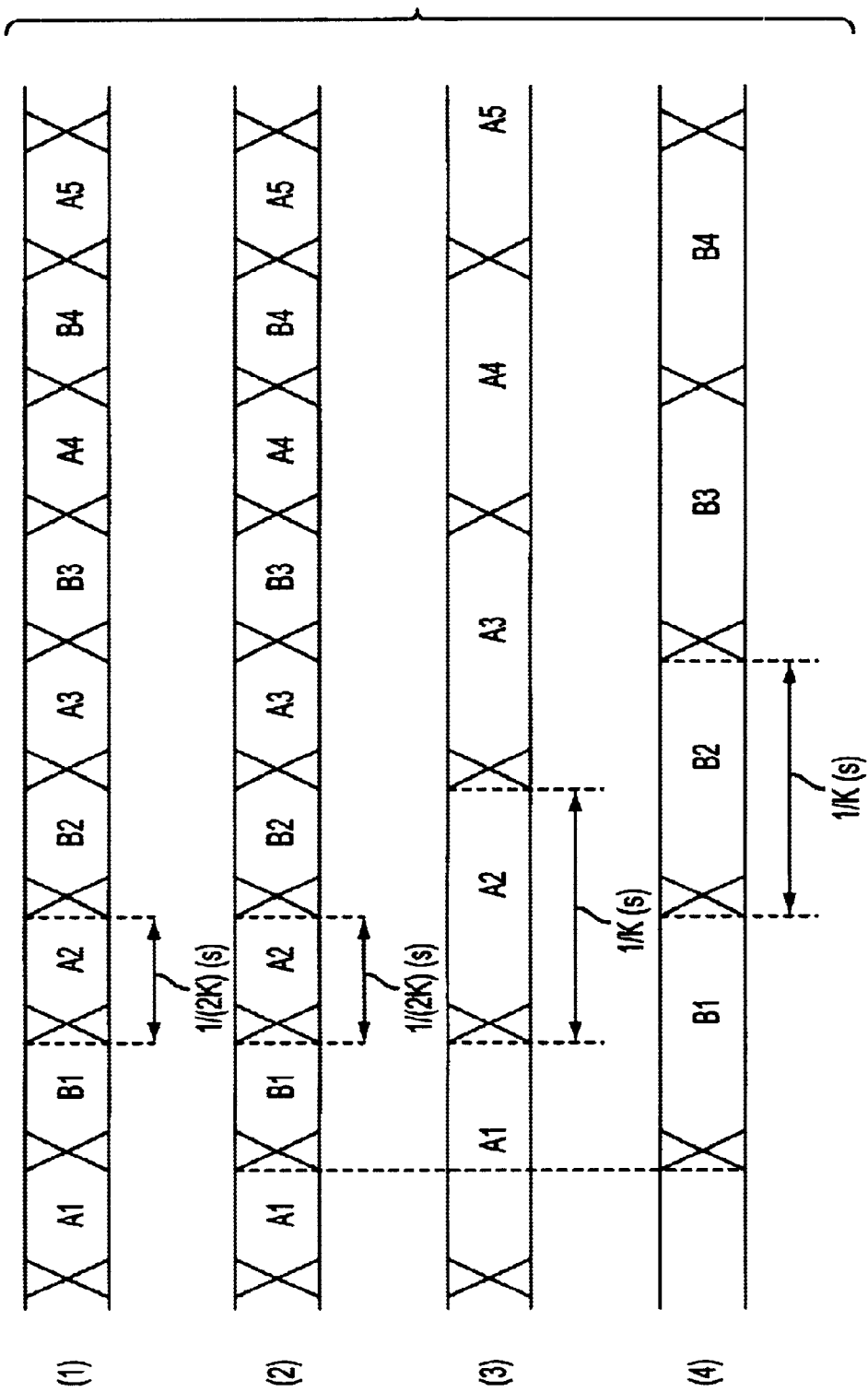
FIG. 6 is a timing chart showing the states of the signal lines (1), (2), and (3) in the second preferred embodiment.

FIG. 6 is a timing chart showing the states of the signals on the signal lines (1) through (4) in the second preferred embodiment.

Also this figure assumes that the switching between the antennas A and B is made at the rate of k times/second. Accordingly, the signal flowing through the signal line (1) is a signal in which the signals A1, A2, A3, . . . from the antenna A and the signals B1, B2, B3, . . . from the antenna B are alternately arranged at an interval of 1/(2k) seconds in time series at time intervals of 1/(2k) seconds. The wireless receiving unit 2 amplifies such a signal unchanged, converts it into a baseband signal, and orthogonal-signal-detects the baseband signal. Therefore, the state of the signal on the signal line (2) is similar to that on the signal line (1). That is, the signals A1, A2, A3, . . . from the antenna A and the signals B1, B2, B3, from the antenna B are alternately arranged at an interval of 1/(2k) seconds in time series.

The states of the signals on the signal lines (3) and (4) at the stage succeeding the branch switching unit 20 are illustrated in (3) and (4) of FIG. 6. Namely, the signals A1, A2, A3, . . . from the antenna A and the signals B1, B2, B3, . . . from the antenna B are respectively separated within the branch switching unit 20 according to the second preferred embodiment, the respectively separated signals are once stored in an antenna A memory and an antenna B memory (within the branch switching unit 20), etc., and the signals A1, A2, A3, . . . and the signals B1, B2, B3, . . . are respectively input to the antenna A matched filter 21-2 and the antenna B matched filter 21-2 via the signal lines (3) and (4). The branch switching unit 20 according to the first preferred embodiment outputs only the signals from either of the antennas A and B, whereas the branch switching unit 4 according to the second preferred embodiment outputs the signals from both of the antennas A and B. A method for extracting the signals from the antennas A and B in the branch switching unit 20 is similar to that used in the first preferred embodiment: the timings at which the antennas are switched are obtained from the antenna switch controller 5; the signals from the antennas A and B are respectively stored in memories, etc. at the obtained timings; and the respective signals from the antennas A and B are continually output. Accordingly, the durations of the signals A1, A2, A3, . . . and the signals B1, B2, B3, . . . are 1/k seconds as shown in (3) and (4) of FIG. 6.Since the signals from both of the antennas A and B can be simultaneously processed as explained in this preferred embodiment, the signals from the antennas A and B can be continuously extracted, thereby effectively using the prevention of degradation of diversity reception quality.

Figure 7:
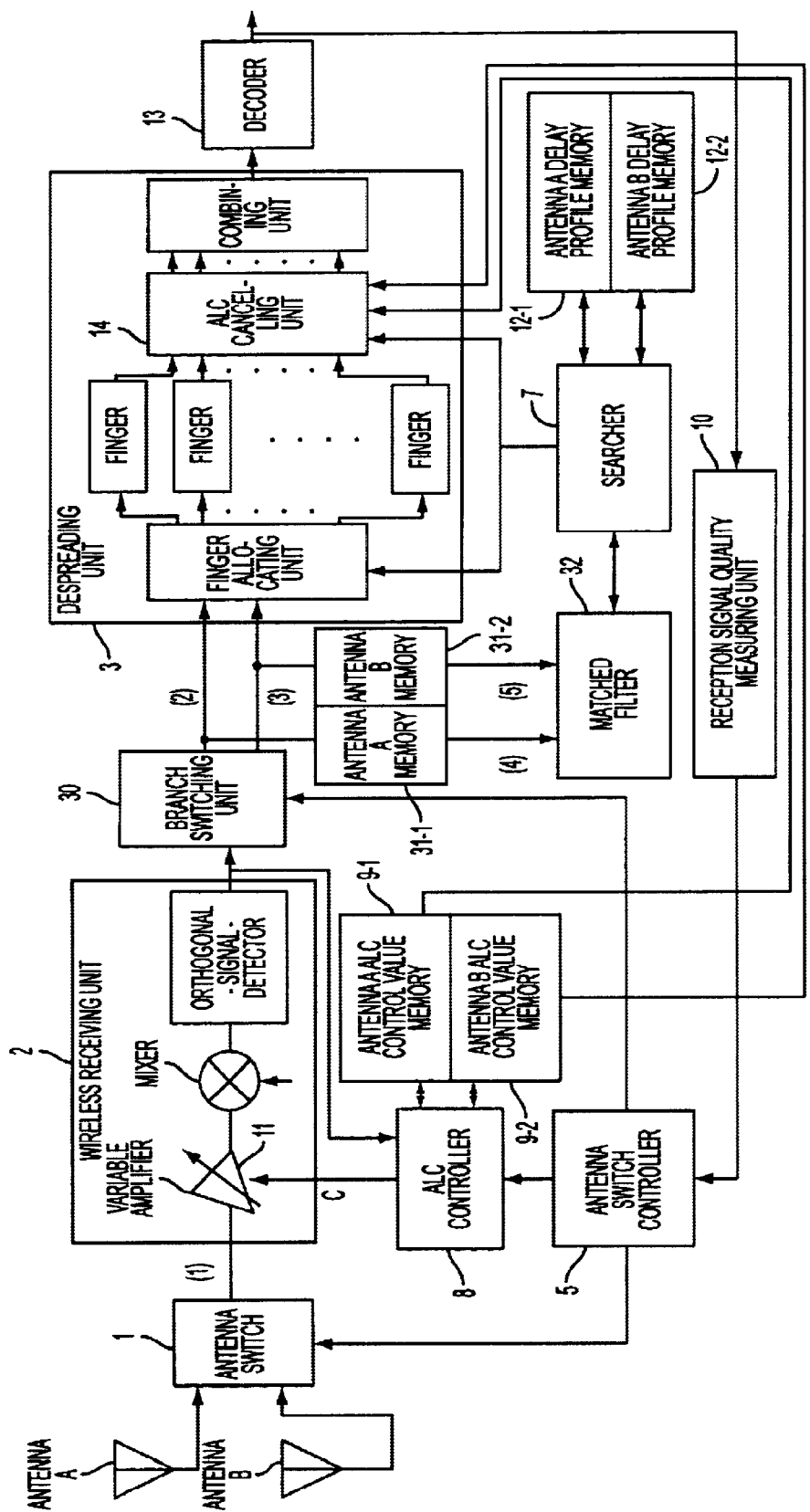
FIG. 7 is a block diagram showing a third preferred embodiment according to the present invention.

FIG. 7 is a block diagram showing the configuration of a third preferred embodiment according to the present invention.

In this figure, the same constituent elements as those shown in FIG. 2 are denoted with the same reference numerals.

In the second preferred embodiment, two searchers and matched filters are prepared for simultaneously enabling the delay profile measurement of the signals received from both of the antennas. In the third preferred embodiment, however, the delay profile measurement is enabled by arranging one searcher and one matched filter. Accordingly, in the third preferred embodiment, the effect of the diversity reception can be attained in a similar manner as in the second preferred embodiment, thereby further reducing a circuit size.

In FIG. 7, the signals from the antennas A and B are alternately switched by the antenna switch 1 that is controlled by the antenna switch controller 5. The signal in which the signals from the antennas A and B are alternately arranged in time series is input to the wireless receiving unit 2. The power levels of the signals output from the wireless receiving unit 2 are controlled to be continually constant by the variable amplifier 11, the ALC controller 8, the antenna A ALC control value memory 9-1, and the antenna B ALC control value memory 9-2, so that the conversion accuracy of an A/D converter, which is not shown in this figure and arranged immediately succeeding the wireless receiving unit 2, can be improved. Details of these operations are similar to those described earlier.

The signals output from the wireless receiving unit 2 are input to a branch switching unit 30. The branch switching unit 30 obtains antenna switch timing signals from the antenna switch controller 5, separates the signals from the antennas A and B, which are alternately transmitted, and transmits the separated signals to the signal lines (2) and (3). In the above described preferred embodiments, the branch selecting unit 4 or the branch switching unit 20 has the configuration corresponding to a memory, which can temporarily store the signals from the antennas A and B, and output the signals. In this case, the memory may be a memory which can actually store signals of a plurality of chips. However, it may be a flip-flop which can hold signals of a single chip. Meanwhile, in the third preferred embodiment, an antenna A memory 31-1 and an antenna B memory 31-2, which can store signals of a plurality of chips, are arranged. Accordingly, the branch switching unit 30 itself may not have a configuration corresponding to a memory.

The antenna A memory 31-1 stores the signals from the antenna A, which are output from the branch switching unit 30, and sequentially outputs the stored signals. Similarly, the antenna B memory 31-2 stores the signals from the antenna B, which are output from the branch switching unit 30, and sequentially outputs the stored signals. The antenna A memory 31-1 and the antenna B memory 31-2 alternately output signals. That is, when one of the antenna A memory 31-1 and the antenna B memory 31-2 outputs a predetermined number of signals, it suspends its output. Then, the other will output the predetermined number of signals. The number of signals is the number of signals partitioned by antenna switching, each of which is defined to be one unit. Namely, when antenna switching is made once, one signal is generated. Supposing that the operation of switching from the antenna A to the antenna B is performed once, the signal from the antenna A is partitioned off at that point. As a result, one signal is formed.

A matched filter 32 sequentially obtains the correlation values of the signals output from the antenna A memory 31-1 and the antenna B memory 31-2, and outputs the obtained values to the searcher 7. Because signals with a duration of 1/(2k) seconds corresponding to the antenna switching rate are output unchanged from the antenna A memory 31-1 and the antenna B memory 31-2. Therefore, the matched filter 32 must be operated at a rate double the rate of the above described preferred embodiments, when being driven at the same sampling rate as that of the embodiments. That is, in the first preferred embodiment, only the signals from one of the antenna A or B are input, and the antenna switching is made to the other to perform diversity reception. In the second preferred embodiment, two matched filters are used, and they can detect correlation values without causing a delay in the processing of input signals. Unlike the first preferred embodiment, correlation values are obtained by processing the signals from both of the antennas, thereby improving processing accuracy in the third preferred embodiment. Furthermore, unlike the second preferred embodiment, only one matched filter 32 is arranged, so that an operating speed must be doubled in the third preferred embodiment.

The matched filter 32 transmits to the searcher 7 a correlation value and a signal indicating from which of the antennas A and B the correlation value is obtained. The searcher 7 stores in the antenna A delay profile memory 12-1 the despreading timing acquired by using the correlation value obtained from the signal from the antenna A along with the correlation value, and stores in the antenna B delay profile memory 12-2 the despreading timing acquired by using the correlation value obtained from the signal from the antenna B along with the correlation value. Then, the correlation values and the information indicating from which branch the signals are received are respectively obtained from the profile memories 12-1 and 12-2. The obtained correlation values and information are transmitted to the finger allocating unit and the ALC cancelling unit 14 within the despreading unit 3 along with the information indicating from which branch the despreading timings with correlation values equal to or larger than a predetermined value are obtained.

Figure 8:
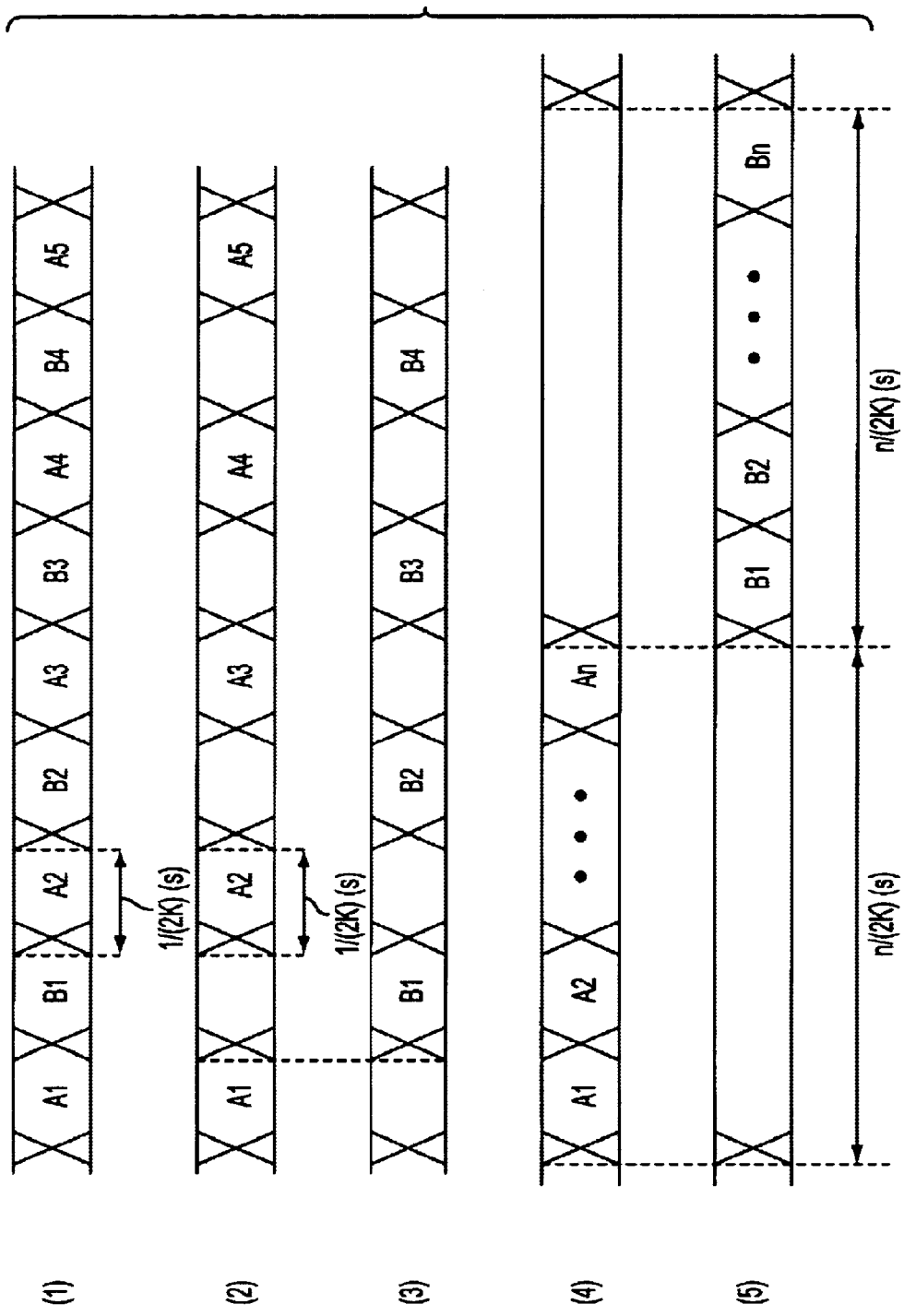
FIG. 8 is a timing chart showing the states of the signals on the signal lines (1) through (5), which are shown in FIG. 7.

FIG. 8 is a timing chart showing the states of signals on the signal lines (1) through (5), which are shown in FIG. 7. In this figure, one symbol is represented by "n" (positive integer) chips.

As is known from (4) and (5) of FIG. 8, the antenna A memory 31-1 and the antenna B memory 31-2, which are shown in FIG. 7, alternately output the signals received from a corresponding antenna after storing the signals for one symbol. The reason why the number of signals stored by the antenna A memory 31-1 and the antenna B memory 31-2 is for one symbol is that the matched filter according to this preferred embodiment is defined to be a filter which can instantaneously calculate the correlation values of reception data for the maximum of one symbol. However, the number of signals does not always need to be stored for one symbol.

On the signal line (1), the signals from the antennas A and B are switched "2k" times (reception chip rate: "k" chips/second) by the antenna switch 1, so that the signals A1, A2, A3, ... (from the antenna A) and the signals B1, B2, B3, ... (from the antenna B) with the time duration of 1/(2k) seconds are alternately arranged in time series and are transmitted.

For the signal lines (2) and (3) at the stage succeeding the branch switching unit 30, only the signals A1, A3, A3, ... from the antenna A are output to the signal line (2), while only the signals B1, B2, B3, ... from the antenna B are output to the signal line (3). The reason why there are gaps, for example, between the signals A1 and A2 and between the signals B1 and B2 is that the branch switching unit 30 only switches between the signals from the antennas A and B, and outputs the switched signals.

On the signal line (4) at the stage succeeding the antenna A memory 31-1, as shown in (4) of FIG. 8, the antenna A memory 31-1 outputs to the matched filter 32 "n" signals shown in (2) of FIG. 8 upon termination of storing the signals, and makes the matched filter 32 detect their correlation values. On the signal line (5) at the stage succeeding the antenna B memory 31-2, the antenna B memory 31-2 outputs to the matched filter 32 "n" signals shown in (3) of FIG. 8 upon termination of storing the signals, and makes the matched filter 32 detect their correlation values. At this time, signals from one of the antenna A memory 31-1 and the antenna B memory 31-2 are input to the matched filter 32 upon termination of the inputs of the signals from the other to the matched filter, so that the signals from the antenna A memory 31-1 and the antenna B memory 31-2 are not simultaneously input to the matched filter 32, as shown in (4) and (5) of FIG. 8. Accordingly, the durations of the signals output from the antenna A memory 31-1 or from the antenna B memory 31-2 at one time will be n/(2k) seconds. Since "n" signals are once stored in the memories and output as described above, the signals received by the antennas A and B will be out of synchronization. However, the value of the clock representing the synchronization timing of the beginning of a signal is provided from the antenna A memory 31-1 or the antenna B memory 31-2 in addition to orthogonal-signal-detected signals. Consequently, even if the correlation value detection process performed by the matched filter 32 becomes synchronous to a detected signal, the timing at which the detected signal is multiplied by a despreading code can be detected.

The above described preferred embodiments assume the configuration where a despreading process is performed after analog signals are converted into digital signals. However, all of processes may be performed for analog signals as they are. In this case, the ALC control is not necessarily required to be performed. It is sufficient to interpose a normal amplifier. As a result, it is not always required to arrange the antenna A ALC control value memory and the antenna B ALC control value memory. Furthermore, the ALC control is not performed, which eliminates the need for arranging the ALC cancelling unit within the despreading unit. A person skilled in the art can easily understand the actual configuration of an analog circuit from the drawings and the explanations of the above described embodiments.

According to the present invention, wireless receiving units which are conventionally arranged for two respective antennas to make diversity reception can be integrated into one, thereby providing a configuration having the advantage of reducing a device in size and power.

What is claimed is:

1. A diversity receiving device using a plurality of antennas in spread spectrum communications, comprising:
   a plurality of antennas;
   switching means for switching between signals from the plurality of antennas, and outputting switched signals;
   wireless receiving means for receiving a signal output from said switching means, in which the signals from the plurality of antennas are alternately arranged in time series, and for detecting the signal;
   separating means for separating a detected signal including the signals from the plurality of antennas into signals from the respective antennas;
   extracting means for extracting despreading timings from signals output from said separating means; and
   decoding means for RAKE-receiving the detected signal including the signals from the plurality of antennas after despreading the detected signal at the despreading timings extracted by said extracting means, and for decoding the signal.

2. The diversity receiving device according to claim 1, further comprising:
   ALC controlling means for performing an ALC control within said wireless receiving means for the signal in which the signals received by the plurality of antennas are alternately arranged in time series; and
   ALC control memory means for storing control information output by said ALC controlling means for each of the plurality of antennas, which corresponds to the individual signals alternately arranged in time series.

3. The diversity receiving device according to claim 1, further comprising
   reception signal quality measuring means for measuring a quality of a signal after being decoded, which is output by said decoding means, for making said switching means suspend switching between the plurality of antennas when a reception signal quality equal to or higher than a predetermined level is measured, and for making said switching means resume the switching between the plurality of antennas when the reception signal quality lower than the predetermined level is measured.

4. The diversity receiving device according to claim 3, wherein a signal-to-noise ratio is used as the reception signal quality.

5. The diversity receiving device according to claim 3, wherein a bit error rate is used as the reception signal quality.

6. The diversity receiving device according to claim 1, wherein said separating means extracts only signals obtained from one antenna from the signal in which the signals from the plurality of antennas are alternately arranged in time series.

7. The diversity receiving device according to claim 1, wherein said separating means separates the signal in which the signals from the plurality of antennas are alternately arranged in time series into the signals which respectively correspond to the plurality of antennas.

8. The diversity receiving device according to claim 1, wherein said extracting means comprises:
   matched filter means for detecting correlation values;
   storing means for storing the correlation values detected by said matched filter means in correspondence with the respective antennas receiving the signals from which the correlation values are obtained; and
   searcher means for detecting despreading timings from the correlation values stored in said storing means.

9. The diversity receiving means according to claim 8, wherein said matched filter means and said searcher means, the numbers of which correspond to the number of the antennas, are arranged.

10. The diversity receiving device according to claim 2, wherein said decoding means comprises an ALC cancelling means for cancelling the ALC control performed for the signal in which the signals from the plurality of antennas are alternately arranged in time series.

11. A diversity receiving method using a plurality of antennas in spread spectrum communications, comprising the steps of:
   (a) switching between signals from the plurality of antennas, and outputting switched signals;

(b) receiving a signal obtained in the step (a), in which the signals from the plurality of antennas are alternately arranged in time series, and for detecting the signal;

(c) separating the detected signal including the signals from the plurality of antennas, which is obtained in the step (b), into the signals from the respective antennas;

(d) extracting despreading timings from the signals obtained in the step (c); and (e) RAKE-receiving the detected signal including the signals from the plurality of antennas after despreading the detected signal at the despreading timings extracted in the step (d), and for decoding the sinal.

12. The diversity receiving method according to claim 11, further comprising the steps of:

(f) performing an ALC control in step (b) for the signal in which the signals from the plurality of antennas are alternately arranged in time series; and (g) storing control information obtained in the step (f) for each of the plurality of antennas, which corresponds to the individual signals alternately arranged in time series.

13. The diversity receiving method according to claim 11, further comprising the step of (h) measuring a quality of a signal after being decoded, which is obtained in the step (e), suspending switching between the plurality of antennas when a reception signal quality equal to or higher than a predetermined level is measured, and resuming the switching between the plurality of antennas when the reception signal quality lower than the predetermined level is measured.

14. The diversity receiving method according to claim 13, wherein a signal-to-noise ratio is used as the reception signal quality.

15. The diversity receiving method according to claim 13, wherein a bit error rate is used as the reception signal quality.

16. The diversity receiving method according to claim 11, wherein only signals from one antenna are extracted from the signal in which the signals from the plurality of antennas are alternately arranged in time series in the step (c).

17. The diversity receiving method according to claim 11, wherein the signal in which the signals from the plurality of antennas are alternately arranged in time series into the signals which respectively correspond to the plurality of antennas in the step.

18. The diversity receiving method according to claim 11, wherein the step (d) comprises the steps of:

(i) detecting correlation values;

(j) storing the correlation values detected in the step (i) in correspondence with the plurality of antennas receiving the signals from which the correlation values are obtained; and (k) detecting despreading timings from the correlation values stored in the step (j).

19. The diversity receiving method according to claim 12, wherein the step (e) comprises the step of cancelling the ALC control performed for the signal in which the signals from the plurality of antennas are alternately arranged in time series.

* * * * *